(12) United States Patent
Zachariassen

(10) Patent No.: US 9,128,848 B2
(45) Date of Patent: Sep. 8, 2015

(54) GENERAL STORAGE CACHE FUNCTIONALITY EXTENSION

(71) Applicant: Rayan Zachariassen, Toronto (CA)

(72) Inventor: Rayan Zachariassen, Toronto (CA)

(73) Assignee: Intel Corporation, Santa Clara, CA (US)

( * ) Notice: Subject to any disclaimer, the term of this patent is extended or adjusted under 35 U.S.C. 154(b) by 160 days.

(21) Appl. No.: 13/976,290

(22) PCT Filed: Feb. 25, 2013

(86) PCT No.: PCT/CA2013/000169
§ 371 (c)(1),
(2) Date: Jun. 26, 2013

(87) PCT Pub. No.: WO2013/123589
PCT Pub. Date: Aug. 29, 2013

(65) Prior Publication Data
US 2014/0359222 A1    Dec. 4, 2014

Related U.S. Application Data

(60) Provisional application No. 61/602,941, filed on Feb. 24, 2012.

(51) Int. Cl.
*G06F 3/00* (2006.01)
*G06F 12/08* (2006.01)
*G06F 17/30* (2006.01)

(52) U.S. Cl.
CPC ........ *G06F 12/0815* (2013.01); *G06F 12/0891* (2013.01); *G06F 12/0893* (2013.01); *G06F 17/30132* (2013.01)

(58) Field of Classification Search
None
See application file for complete search history.

(56) References Cited

U.S. PATENT DOCUMENTS

| | | | |
|---|---|---|---|
| 5,249,284 A | 9/1993 | Kass et al. | |
| 6,000,015 A | 12/1999 | Whittaker | |
| 6,467,024 B1 | 10/2002 | Bish et al. | |
| 7,130,957 B2 * | 10/2006 | Rao | 711/3 |
| 8,117,396 B1 | 2/2012 | Fair et al. | |
| 2010/0235542 A1 | 9/2010 | Visharam et al. | |
| 2012/0210068 A1 * | 8/2012 | Joshi et al. | 711/122 |

OTHER PUBLICATIONS

PCT Search Report and Written Opinion, PCT/CA2013/000169, 4 pages, May 16, 2013.

* cited by examiner

*Primary Examiner* — Idriss N Alrobaye
*Assistant Examiner* — Richard B Franklin
(74) *Attorney, Agent, or Firm* — Blakely, Sokoloff, Taylor & Zafman LLP

(57) ABSTRACT

A system comprises a storage device, a cache coupled to the storage device and a metadata structure, coupled to the storage device and the cache, having metadata corresponding to each data location in the cache to control data promoted to the cache from the storage device.

17 Claims, 3 Drawing Sheets

GENERAL STORAGE CACHE FUNCTIONALITY EXTENSION

The present patent application is a U.S. National Phase Application under 35 U.S.C. 371 of International Application No. PCT/CA2013/000169 filed Feb. 25, 2013, which claims priority from U.S. Provisional Application No. 61/602,941, filed Feb. 24, 2012, the contents of which are incorporated herein in their entirety by reference.

FIELD OF THE INVENTION

Embodiments of the invention relate to the field of data storage, and more specifically to a system and method for providing policy and coherence features for a cache.

BACKGROUND OF THE INVENTION

Caching systems in the data storage art have traditionally operated with fixed units of data to be cached: blocks, extents, LUNs (logical drives), etc., in the storage system. At that level, far below and removed from the level of applications or file systems, there is no ability to make use of contextual information (e.g., contextual criteria such as file name, application name, user information, etc.,) in caching decisions. Past art has focused on attempting to derive context from the data storage system operations visible to the cache, which operate on or within fixed units of storage.

A recent invention is the ability to make use of context in caching decisions by situating the caching function at the level of file systems where contextual information is available (so-called "file caches"). However, most caches are "block caches" in that they operate at the storage device level and see operations on blocks of data where the context of the storage operation has been lost. For such caches it would be useful to be able to provide similar features and functionality of the file caches.

In fact it would be even more useful to be able to provide such features and functionality without the cooperation of the block cache because such cooperation is rarely possible: block caches tend to be pre-existing and/or third party technology and may even be remote to where the context of the storage operation originates or resides. What is needed is a mechanism to provide added features that improve the efficiency or scalability of existing block caches.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

DESCRIPTION OF THE EMBODIMENTS

Embodiments of the invention provide metadata for each data location in storage and a component with contextual information to control the metadata. Provided such metadata, access to a particular data location in the storage could be fulfilled either through the cache or directly to the storage to control data that is promoted to a cache.

Figure 1:
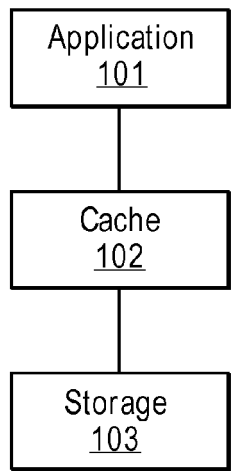
FIG. 1 illustrates a conventional storage system.

With reference to FIG. 1, a system 100 is shown. System 100 is a conventional system that includes a cache 102 is coupled between an application 101 and storage device (or storage) 104. In operation, application 101, upon execution by a central processing unit (CPU), requests data from storage 104. However, time to access the data is reduced if the data is included in cache 102. However, as described above, there is no ability in system 100 to make use of contextual information in caching decisions.

Figure 2:
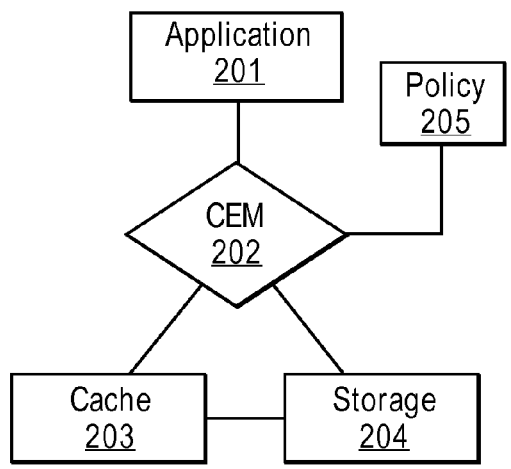
FIG. 2 illustrates one embodiment of a storage system.

According to one embodiment, FIG. 2 discloses a system 200 that includes a cache eligibility map (CEM) 202 coupled between application 201, cache 203 and storage device 204 that has simultaneously access to cache 203 and storage 204. According to one embodiment, CEM 202 stores a map including metadata entry for each data location in storage 204. Further, a policy module 205 stores contextual information that controls the metadata. Provided the metadata, access to a particular data location in storage 204 may be fulfilled through either cache 203 or directly to storage 204. Thus, the CEM 202 controls what data is promoted to the cache 203.

In one embodiment, system 200 is included within the context of an operating system. However cache 203 can equally be under the operating system in hardware and/or remote from the application system. For embodiments in which system 200 is implemented in a Linux® operating system, multiple block based cache drivers are included that form part of the Linux distribution or are available from third parties. These include "dm-cache" (Linux kernel), "Bcache" (Linux kernel), "FlashCache" (from FaceBook®, see GitHub), and others.

In software based cache embodiments, CEM 202 has simultaneous access to both cache 203 and storage 204. In a hardware based cache that does not allow independent access to the underlying storage, as may be provided by a device (e.g., a PCIe card, or Solid State Disk, or flash memory on the motherboard, etc.), CEM 202 may be partially implemented in software in the operating system environment (e.g., policy 205) and partially in some form within the hardware that provides the cache (e.g. as firmware that implements the CEM component), in which there is a communication channel between these components. In such an embodiment, situation the invention is integrated with the cache implementation and it would therefore be a fully cooperative situation.

In a non-cooperative hardware based cache that does allow independent access to the underlying storage, the invention may be implemented in the operating system of the application and may function correctly for any read cache. For a non-cooperative write cache implemented in hardware, some form of dirty data detector may be used to enable the invention to function correctly.

In one embodiment, policy module 205 implements a flow of information about file based operations on the system. In the Linux embodiment there are several ways of accomplishing this, including using the fsnotify/inotify interfaces available with the standard system. However, one embodiment uses kernel probes around the core of the do_filp_open( ) routine to pass relevant context information for every file open to a user level policy module that determines, based on configuration information, which application accesses of files are interesting. The information available includes file path, application name, user id of the process, and all other information available in the context of a user process in the kernel.

According to one embodiment, CEM 202 includes a bit for each data block in cache 203. Thus, when a deemed-interesting file open occurs, a file map system call (in Linux these are the FIEMAP and FIBMAP ioctl's) is used to retrieve file layout information on storage 204 and the corresponding metadata bits associated with the data blocks where the file is actually stored are then set (if not already). The metadata bits may be cleared when the last close of a particular file occurs. In such a scenario, reference counting may occur to keep track of the cache eligibility state of a particular data block. However, other embodiments may not track this information and instead leaves it to the cache eviction policy to deal with unused cache data.

However, when the file is moved on disk for whatever reason, CEM 202 is maintained and the appropriate bits cleared. For most Unix file systems, the initial data placement is also the permanent data placement and this only needs to be tracked for file removals (unlinks). Some file systems and defragmenters do cause data blocks to move on disk and this situation can be tracked through a polling mechanism in policy module 205 to check on current file layouts for cached files, as compared to prior information. Subsequently, policy module 205 updates CEM 202, which performs the actual I/O direction to cache 203 or storage 204 as appropriate, with incremental changes to CEM 202. In other embodiments, the process may be accomplished by sharing CEM 202 between components in shared memory.

In one embodiment, CEM 202 is implemented as an operating system block driver, configured to access two downstream block drivers (cache 203 and storage 204) and select between them based on CEM 202 for each operation it sees. Some operations that correspond to different directions for different parts of the operation may have to be broken apart to pass on and reassembled on the return in order to provide full transparency upstream. CEM 202 may additionally implement other caching types, for example changing a write-through read cache to a write-around read cache by always directing writes to storage.

In an embodiment that implements a traditional cache promotion policy (determining what enters the cache) based on contextual criteria, the metadata information includes a flag (a bit) indicating "eligible" or "not eligible" for the referenced data. When the data is actually referenced by the application, operation is directed to cache 203 when the cache eligibility flag is set, and otherwise to storage 204, thus ensuring that only "eligible" data is cached. In such an embodiment, eligibility is determined by a policy module 205.

Figure 3:
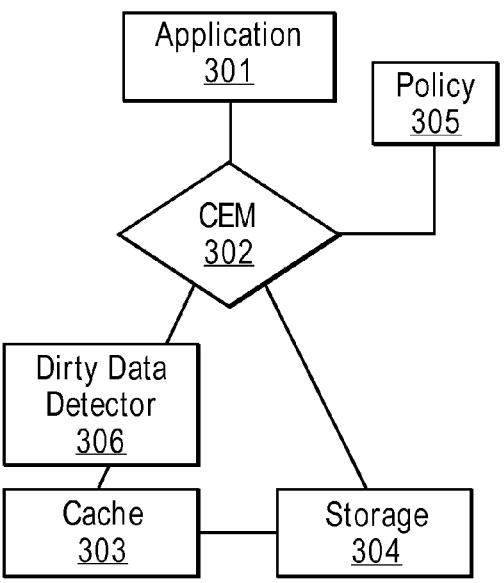
FIG. 3 illustrates another embodiment of a storage system.

FIG. 3 illustrates an embodiment of a system 300 in which CEM 302 is implemented in a cache 303 having a clean or dirty state. In system 300, a map for a write cache provides an indication of the clean or dirty state of the data in cache 303. This information is implemented for write-back caches to enable CEM 302 to have knowledge as to whether to direct an operation to cache 303 even if that data is no longer eligible for caching. In a cooperative situation between cache 303 and CEM 302 this information could be found by, or made available to, CEM 302.

However, in a non-cooperative situation (the cache data structures are opaque or inaccessible or not safely accessible given concurrency issues) this information may also be determined by wrapping the cache in a "dirty data detector" (306) shown in FIG. 3 that keeps track of whether, for a particular data location, data written to cache 303 was subsequently written to primary storage. The resulting map is subsequently used by CEM 302 to determine whether to access current data through the cache or directly from storage 304, or even whether to explicitly flush particular dirty data from cache 303 to storage 304, for example, maintain coherence among multiple caches.

Figure 4:
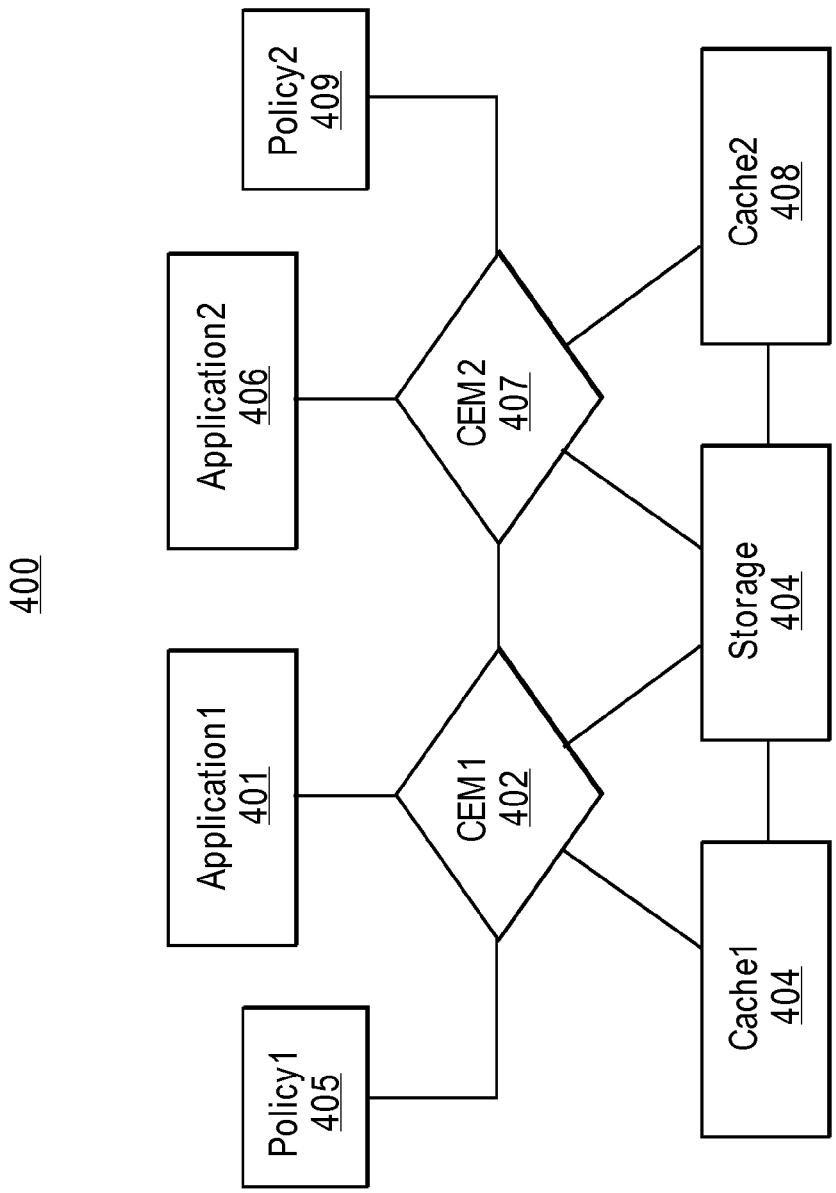
FIG. 4 illustrates yet another embodiment of a storage system.

FIG. 4 illustrates an embodiment of a system 400 having multiple caches (403 and 408). In such an embodiment, CEM 402 and policy module 405 correspond to cache 403, while CEM 407 and policy module 409 correspond to cache 408. Thus, in system 400 two systems cooperate to provide cache coherence for a shared storage component by the CEM components (402 and 407) communicating to implement a coherence protocol to maintain consistency of the data for the applications 401 and 406.

In system 400 CEM 402 and 407 include a map that provides "permission to read" or "permission to write" information about data could be used to implement coherence among multiple caches with a view of the same storage 404. In such an embodiment, permission is granted only when the data is known coherent (e.g., consistent views from multiple caches) or known exclusive access to a single cache. Lack of permission would imply suspending the operation while permission is obtained.

Figure 5:
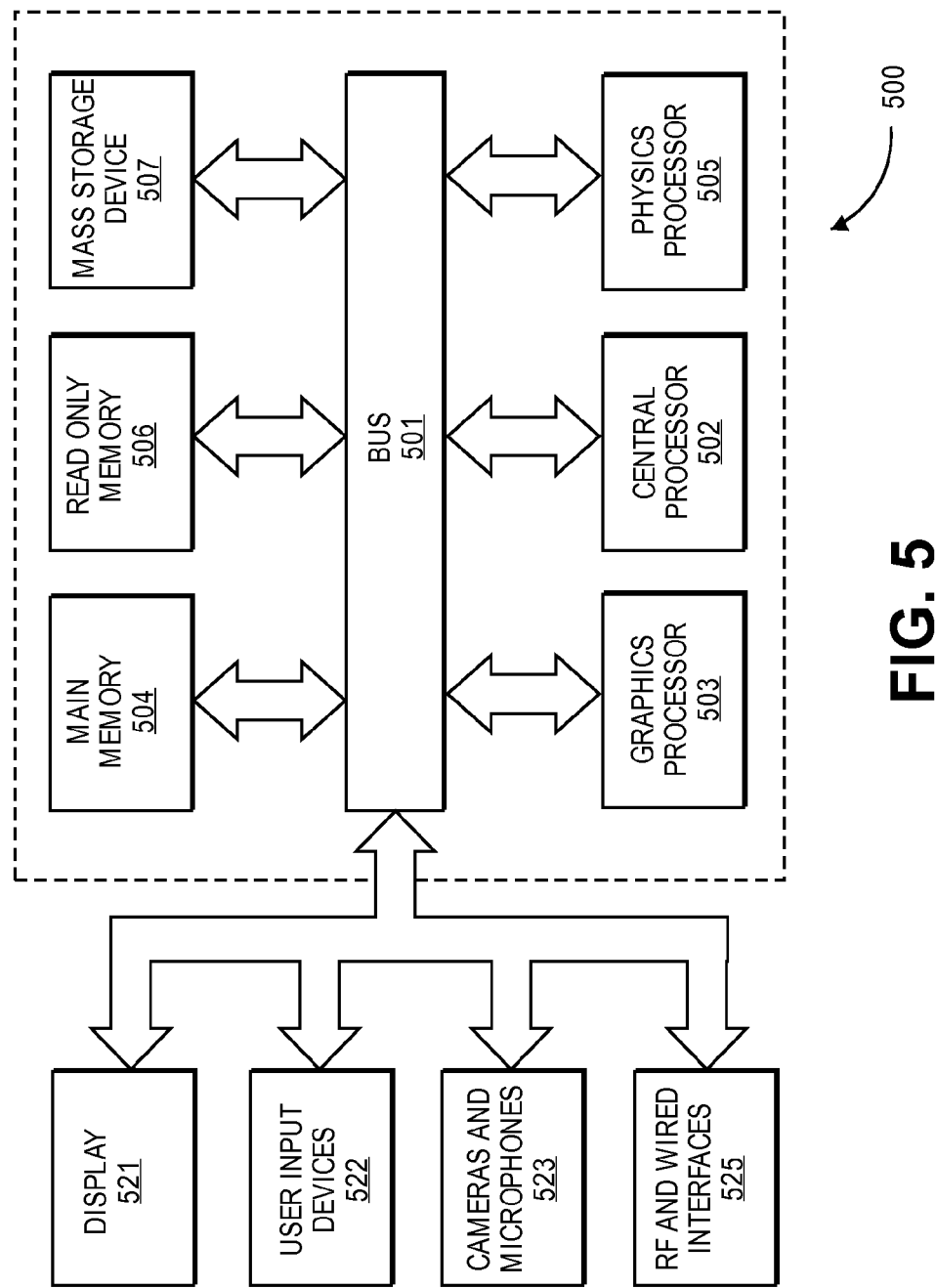
FIG. 5 is a block diagram of one embodiment of a computer system suitable for implementing processes of the present disclosure according to an embodiment of the invention.

FIG. 5 is a block diagram of a computing system, such as a personal computer, gaming console, smart phone or portable gaming device in which the above-described system may be implemented. Computer system 500 may refer to a many examples of an electronic device and may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof.

The computer system 500 includes a bus or other communication means 501 for communicating information, and a processing means such as a microprocessor 502 coupled with the bus 501 for processing information. In the illustrated example, processing devices are shown within the dotted line, while communications interfaces are shown outside the dotted line, however the particular configuration of components may be adapted to suit different applications. The computer system may be augmented with a graphics processor 503 specifically for rendering graphics through parallel pipelines and a physics processor 505 for calculating physics interactions as described above. These processors may be incorporated into the central processor 502 or provided as one or more separate processors. The computer system 500 further includes a main memory 504, such as a random access memory (RAM) or other dynamic data storage device, coupled to the bus 501 for storing information and instructions to be executed by the processor 502. The main memory also may be used for storing temporary variables or other intermediate information during execution of instructions by the processor. The computer system may also include a non-volatile memory 506, such as a read only memory (ROM) or other static data storage device coupled to the bus for storing static information and instructions for the processor.

A mass memory 507 such as a magnetic disk, optical disc, or solid state array and its corresponding drive may also be coupled to the bus of the computer system for storing information and instructions. The computer system can also be coupled via the bus to a display device or monitor 521, such as a Liquid Crystal Display (LCD) or Organic Light Emitting Diode (OLED) array, for displaying information to a user. For example, graphical and textual indications of installation status, operations status and other information may be presented to the user on the display device, in addition to the various views and user interactions discussed above.

Typically, user input devices 522, such as a keyboard with alphanumeric, function and other keys, may be coupled to the bus for communicating information and command selections to the processor. Additional user input devices may include a cursor control input device such as a mouse, a trackball, a trackpad, or cursor direction keys can be coupled to the bus for communicating direction information and command selections to the processor and to control cursor movement on the display 521.

Camera and microphone arrays 523 are coupled to the bus to observe gestures, record audio and video and to receive visual and audio commands as described above. Communications interfaces 525 are also coupled to the bus 501. The communication interfaces may include a modem, a network interface card, or other well known interface devices, such as those used for coupling to Ethernet, token ring, or other types of physical wired or wireless attachments for purposes of providing a communication link to support a local or wide area network (LAN or WAN), for example. In this manner, the computer system may also be coupled to a number of peripheral devices, other clients, control surfaces or consoles, or servers via a conventional network infrastructure, including an Intranet or the Internet, for example.

A lesser or more equipped system than the example described above may be preferred for certain implementations. Therefore, the configuration of the exemplary systems 500 will vary from implementation to implementation depending upon numerous factors, such as price constraints, performance requirements, technological improvements, or other circumstances.

The following examples pertain to further embodiments of the invention.

In one embodiment, a system comprises a storage device, a cache coupled to the storage device and a metadata structure, coupled to the storage device and the cache, having metadata corresponding to each data location in the cache to control data promoted to the cache from the storage device.

In one embodiment, the metadata structure has simultaneous access to the storage device and the cache.

In one embodiment, the system further comprises an application coupled to the metadata structure to access to the storage device and the cache.

In one embodiment, the system further comprises a policy module having contextual information to control the metadata structure.

In one embodiment, the metadata comprises a flag indicating whether data in a corresponding location in the cache is eligible.

In one embodiment, data is accessed to the cache when a flag indicates that the corresponding location in the cache is eligible.

In one embodiment, data is accessed from the storage device when a flag indicates that the corresponding location in the cache is not eligible.

In one embodiment, the metadata indicates a clean or dirty state of data in the cache.

In one embodiment, the system further comprises a dirty data detector to track whether data written to data locations in the cache were subsequently written to the storage device.

In one embodiment, the system further comprises a second cache coupled to the storage device, a second metadata structure, coupled to the storage device, the second cache and the first metadata structure, having metadata corresponding to each data location in the second cache to control data promoted from the second cache from the storage device and a second policy module having contextual information to control the second metadata structure.

In one embodiment, the metadata provides permission to read and permission to write information regarding data used to implement coherence among the first and second caches.

In one embodiment, a method comprises receiving a request from an application to access data and determining whether access to the data is to be fulfilled by a cache or storage device based on metadata corresponding to a location in the cache.

In one embodiment, the metadata structure controls data promoted from the storage device to the cache.

In one embodiment, at least one machine readable medium comprises a plurality of instructions that in response to being executed on a computing device, cause the computing device to receive a request from an application to access data and determine whether access to the data is to be fulfilled by a cache or storage device based on metadata corresponding to a location in the cache.

CONCLUSION

In this description, numerous details have been set forth to provide a more thorough explanation of embodiments of the invention. It should be apparent, however, to one skilled in the art, that embodiments of the invention may be practiced without these specific details. In other instances, well-known structures and devices have been shown in block diagram form, rather than in detail, in order to avoid obscuring embodiments of the invention.

Some portions of this detailed description are presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from this discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of invention also relate to apparatuses for performing the operations herein. Some apparatuses may be specially constructed for the required purposes, or may comprise a general purpose computer selectively activated or configured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method. The required structure for a variety of these systems appears from the description herein. In addition, embodiments of the invention are not described with reference to any particular programming language. It will be appreciated that a variety of programming languages may be used to implement the embodiments of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices, etc.

Whereas many alterations and modifications of the embodiment of the invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims that recite only those features regarded as essential to the invention.

The invention claimed is:

1. A system comprising:
a storage device;
a first cache coupled to the storage device;
a second cache coupled to the storage device;
a first metadata structure, coupled to the storage device and the first cache, having metadata corresponding to each data location in the first cache to control data promoted to the first cache from the storage device;
a second metadata structure, coupled to the storage device, the second cache and the first metadata structure, having metadata corresponding to each data location in the second cache to control data promoted from the second cache from the storage device;
an application coupled to the first metadata structure to access to the storage device and the first cache;
a first policy module having contextual information related to the application to control the first metadata structure; and
a second policy module having contextual information to control the second metadata structure;
wherein the metadata provides permission to read and permission to write information regarding data used to implement coherence among the first and second caches.

2. The system of claim 1 wherein the first metadata structure has simultaneous access to the storage device and the first cache.

3. The system of claim 1 wherein the metadata comprises a flag indicating whether data in a corresponding location in the first cache is eligible.

4. The system of claim 3 wherein data is accessed to the first cache when a flag indicates that the corresponding location in the first cache is eligible.

5. The system of claim 4 wherein data is accessed from the storage device when a flag indicates that the corresponding location in the first cache is not eligible.

6. The system of claim 1 wherein the metadata indicates a clean or dirty state of data in the first cache.

7. The system of claim 6 further comprising a dirty data detector to track whether data written to data locations in the first cache were subsequently written to the storage device.

8. A method comprising:
receiving a request from an application to access data; and
determining whether access to the data is to be fulfilled by a first cache, a second cache or storage device based on metadata corresponding to a location in the first and second caches, the metadata structure controls data promoted from the storage device to the first and second caches;
storing metadata in a metadata structure corresponding to each data location in a the first and second caches; and
controlling the metadata corresponding to contextual information related to the application, wherein the metadata provides permission to read and permission to write information regarding data used to implement coherence among the first and second caches.

9. The method of claim 8 wherein the metadata comprises a flag indicating whether data in a corresponding location in the first or second cache is eligible.

10. The method of claim 9 further comprising:
determining if the flag indicates that a corresponding location in the first or second cache is eligible;
accessing the data to the cache if the flag indicates that the corresponding location in the first or second cache is eligible; and
accessing the data from the storage device if the flag indicates that the corresponding location in the first or second cache is not eligible.

11. The method of claim 8 wherein the metadata indicates a clean or dirty state of data in the first or second cache.

12. The method of claim 11 further comprising tracking whether data written to data locations in the first and second caches were written to the storage device.

13. At least one non-transitory machine readable medium comprising a plurality of instructions that in response to being executed on a computing device, cause the computing device to:
receiving a request from an application to access data; and
determining whether access to the data is to be fulfilled by a first cache, a second cache or storage device based on metadata corresponding to a location in the first and second caches, the metadata structure controls data promoted from the storage device to the first and second caches;
storing metadata in a metadata structure corresponding to each data location in a the first and second caches; and controlling the metadata corresponding to contextual information related to the application, wherein the metadata provides permission to read and permission to write information regarding data used to implement coherence among the first and second caches.

14. The at least one machine readable medium of claim 13, wherein the metadata comprises a flag indicating whether data in a corresponding location in the first or second cache is eligible.

15. The at least one machine readable medium of claim 14 further comprising instructions that in response to being executed on a computing device, cause the computing device to:
- determine if the flag indicates that a corresponding location in the first or second cache is eligible;
- access the data to the cache if the flag indicates that the corresponding location in the first or second cache is eligible; and
- access the data from the storage device if the flag indicates that the corresponding location in the first or second cache is not eligible.

16. The at least one machine readable medium of claim 15 further comprising instructions that in response to being executed on a computing device, cause the computing device to tracking whether data written to data locations in the first and second caches were written to the storage device.

17. The at least one machine readable medium of claim 13 wherein the metadata indicates a clean or dirty state of data in the first or second cache.

* * * * *